(12) United States Patent
Cai

(10) Patent No.: US 12,051,264 B2
(45) Date of Patent: Jul. 30, 2024

(54) LIGHT SENSOR AND DISPLAY DEVICE

(71) Applicant: TCL China Star Optoelectronics Technology Co., Ltd., Guangdong (CN)

(72) Inventor: Guangshuo Cai, Guangdong (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 851 days.

(21) Appl. No.: 17/255,538

(22) PCT Filed: Dec. 23, 2020

(86) PCT No.: PCT/CN2020/138485
§ 371 (c)(1),
(2) Date: Dec. 23, 2020

(87) PCT Pub. No.: WO2022/120949
PCT Pub. Date: Jun. 16, 2022

(65) Prior Publication Data
US 2022/0406088 A1 Dec. 22, 2022

(30) Foreign Application Priority Data
Dec. 7, 2020 (CN) .......................... 202011430485.X

(51) Int. Cl.
G06V 40/13 (2022.01)
G06F 21/32 (2013.01)
H01L 27/12 (2006.01)

(52) U.S. Cl.
CPC .......... *G06V 40/1318* (2022.01); *G06F 21/32* (2013.01); *H01L 27/1225* (2013.01)

(58) Field of Classification Search
CPC .. G06V 40/1318; G06F 21/32; H01L 27/1225
See application file for complete search history.

(56) References Cited

U.S. PATENT DOCUMENTS

| 5,075,237 A | 12/1991 | Wu | |
| 2011/0024739 A1* | 2/2011 | Shu | ........................ H01L 31/115 257/53 |
| 2014/0342490 A1* | 11/2014 | Xu | .................... H01L 27/14687 438/59 |
| 2021/0020872 A1* | 1/2021 | Park | .................... H01L 27/1251 |

FOREIGN PATENT DOCUMENTS

| CN | 1663047 | 8/2005 |
| CN | 101636691 | 1/2010 |
| CN | 102479752 | 5/2012 |
| CN | 103762251 | 4/2014 |

(Continued)

*Primary Examiner* — Pinalben Patel

(57) ABSTRACT

The present application provides a light sensor and a display device. A light sensing transistor and a switching transistor in the light sensor are configured to form a light sensor circuit. In a structural design, amorphous silicon is configured as a first active pattern of the light sensing transistor, so that a thickness of a channel region of the first active pattern is greater than or equal to 5000 angstroms. Therefore, a number of photo-generated carriers of the light sensing transistor is increased, which makes the light sensor have higher responses and increases fingerprint or palmprint recognition success rates.

20 Claims, 4 Drawing Sheets

(56) References Cited

FOREIGN PATENT DOCUMENTS

| | | |
|---|---|---|
| CN | 104699344 | 6/2015 |
| CN | 111508986 | 8/2020 |
| CN | 111508987 | 8/2020 |
| CN | 111627927 | 9/2020 |
| CN | 111863837 | 10/2020 |
| JP | 2012-053050 | 3/2012 |

* cited by examiner

LIGHT SENSOR AND DISPLAY DEVICE

RELATED APPLICATIONS

This application is a National Phase of PCT Patent Application No. PCT/CN2020/138485 having International filing date of Dec. 23, 2020, which claims the benefit of priority of Chinese Patent Application No. 202011430485.X filed on Dec. 7, 2020. The contents of the above applications are all incorporated by reference as if fully set forth herein in their entirety.

FIELD AND BACKGROUND OF THE INVENTION

The present application is related to the field of sensing technology, and specifically, to a sensor and a display device.

With rapid development of e-commerce, in order to achieve security, current online transaction systems adopt fingerprint or palmprint recognition. Current fingerprint recognition light sensors have problems such as high cost, large volume, and image distortion, so sensors based on silicon chips have emerged. However, the sensors based on the silicon chips are prone to electrostatic breakdown and are also affected by environment, resulting in poor performance of the sensors based on the silicon chips. In addition, because reflected light of fingerprints is weak, or ridge pitches of fingerprints are small, the sensors need to achieve higher high-light responses in a small unit area. The current light sensors cannot meet demands and are prone to the Poole-Frenkel effect under high load voltage, which decreases light-dark current ratio and reliability of the light sensors.

Therefore, the current fingerprint recognition light sensors have technical problem of low responses, resulting in a poor recognition success rate.

SUMMARY OF THE INVENTION

The present application provides a light sensor and a display device to sole technical problems of low responses of current fingerprint recognition light sensors, resulting in a poor recognition success rate.

In order to solve the above problem, technical solutions provided by the present application are as follows.

An embodiment of the present application provides a light sensor. The light sensor includes:
  a substrate;
  a gate layer disposed on a side of the substrate;
  a gate insulating layer disposed on a side of the gate layer away from the substrate;
  an active layer disposed on a side of the gate insulating layer away from the gate layer, wherein the active layer is patterned to form a first active pattern and a second active pattern;
  a source/drain layer patterned to form a first source, a first drain, a second source, and a second drain; and
  a protective layer disposed on the source/drain layer and provided with through holes.

The light sensor further includes a light sensor circuit. The light sensor circuit includes a light sensing transistor and a switching transistor. The light sensing transistor includes the first active pattern. The switching transistor includes the second active pattern. Material of the first active pattern includes amorphous silicon. A thickness of a channel region of the first active pattern is greater than or equal to 5000 angstroms.

In an embodiment, a thickness of the first active pattern is greater than a thickness of the second active pattern, and a width/length ratio of the first active pattern is greater than or equal to a width/length ratio of the second active pattern.

In an embodiment, a thickness of the first active pattern is greater than a thickness of the second active pattern, and a volume of the first active pattern is less than or equal to a volume of the second active pattern.

In an embodiment, the first active pattern includes a non-doped active portion and a doped active portion. The non-doped active portion includes a high-speed amorphous silicon portion and a low-speed amorphous silicon portion. A thickness of the high-speed amorphous silicon portion ranges from 40 to 60 times of a thickness of the low-speed amorphous silicon portion.

In an embodiment, the active layer includes a first active layer and a second active layer. The first active layer is patterned to form the first active pattern. The second active layer is patterned to form the second active pattern.

In an embodiment, the light sensor further includes a metal pattern. The metal pattern is connected to the first source and the second drain or is connected to the first drain and the second source through the through holes of the protective layer.

In addition, an embodiment of the present application provides a display device. The display device includes a light sensor and a display panel. the light sensor includes:
  a substrate;
  a gate layer disposed on a side of the substrate;
  a gate insulating layer disposed on a side of the gate layer away from the substrate;
  an active layer disposed on a side of the gate insulating layer away from the gate layer, wherein the active layer is patterned to form a first active pattern and a second active pattern;
  a source/drain layer patterned to form a first source, a first drain, a second source, and a second drain; and
  a protective layer disposed on the source/drain layer and provided with through holes.

The light sensor further includes a light sensor circuit. The light sensor circuit includes a light sensing transistor and a switching transistor. The light sensing transistor includes the first active pattern. The switching transistor includes the second active pattern. Material of the first active pattern includes amorphous silicon. A thickness of a channel region of the first active pattern is greater than or equal to 5000 angstroms.

In an embodiment, the display device further includes a pixel electrode layer and a metal pattern. The pixel electrode layer is disposed on the protective layer. The pixel electrode layer is etched to form the metal pattern and a pixel electrode.

In an embodiment, the display device further includes a common electrode layer. The common electrode layer is etched to form a light-shielding pattern. The light-shielding pattern is disposed in a region corresponding to the switching transistor.

In an embodiment, the display device further includes a planarization layer. A thickness of the planarization layer corresponding to the light sensing transistor is less than a thickness of the planarization layer corresponding to the switching transistor.

In an embodiment, a thickness of the first active pattern is greater than a thickness of the second active pattern, and a width/length ratio of the first active pattern is greater than or equal to a width/length ratio of the second active pattern.

In an embodiment, a thickness of the first active pattern is greater than a thickness of the second active pattern, and a volume of the first active pattern is less than or equal to a volume of the second active pattern.

In an embodiment, the thickness of the second active pattern is less than or equal to 1200 angstroms.

In an embodiment, the first active pattern includes a non-doped active portion and a doped active portion. The non-doped active portion includes a high-speed amorphous silicon portion and a low-speed amorphous silicon portion. A thickness of the high-speed amorphous silicon portion ranges from 40 to 60 times of a thickness of the low-speed amorphous silicon portion.

In an embodiment, a thickness of the low-speed amorphous silicon portion ranges from 100 to 200 angstroms, and a thickness of the high-speed amorphous silicon portion is greater than or equal to 5000 angstroms.

In an embodiment, the active layer includes a first active layer and a second active layer. The first active layer is patterned to form the first active pattern. The second active layer is patterned to form the second active pattern.

In an embodiment, material of the second active layer includes one of indium zinc oxide, indium oxide, indium gallium zinc oxide, or zinc oxide.

In an embodiment, material of the second active pattern includes amorphous silicon.

In an embodiment, the light sensor further includes a metal pattern. The metal pattern is connected to the first source and the second drain or is connected to the first drain and the second source through the through holes of the protective layer.

In an embodiment, material of the metal pattern includes at least one of indium tin oxide, molybdenum-copper laminate, aluminum-molybdenum laminate, or aluminum-copper-molybdenum-titanium-alloy laminate.

The present application provides the light sensor and the display device. The light sensor includes the substrate, the gate layer, the gate insulating layer, the active layer, the source/drain layer, and the protective layer. The gate layer is disposed on the side of the substrate. The gate insulating layer is disposed on the side of the gate layer away from the substrate. The active layer is disposed on the side of the gate insulating layer away from the gate layer. The active layer is patterned to form a first active pattern and a second active pattern. The source/drain layer patterned to form the first source, the first drain, the second source, and the second drain. The protective layer is disposed on the source/drain layer and provided with the through holes. The light sensor further includes the light sensor circuit. The light sensor circuit includes the light sensing transistor and the switching transistor. The light sensing transistor includes the first active pattern. The switching transistor includes the second active pattern. The material of the first active pattern includes amorphous silicon. The thickness of the channel region of the first active pattern is greater than or equal to 5000 angstroms. The present application configures the light sensing transistor and the switching transistor to form the light sensor circuit. Moreover, in a structural design, amorphous silicon is configured as the first active pattern of the light sensing transistor, so that the thickness of the channel region of the first active pattern is greater than or equal to 5000 angstroms. Therefore, a number of photo-generated carriers of the light sensing transistor is increased, which makes the light sensor have higher responses and increases fingerprint or palmprint recognition success rates.

DESCRIPTION OF SPECIFIC EMBODIMENTS OF THE INVENTION

The present application provides a light sensor and a display device. In order to make purposes, technical solutions, and effects of the present application clearer and more specific, the present application is further described in detail below with reference to the accompanying drawings and examples. It should be understood that the specific embodiments described herein are only used to explain the application, and are not used to limit the present application.

Current fingerprint recognition light sensors have technical problem of low responses, resulting in a poor recognition success rate. Embodiments of the present application aim to solve the technical problem.

Figure 1:
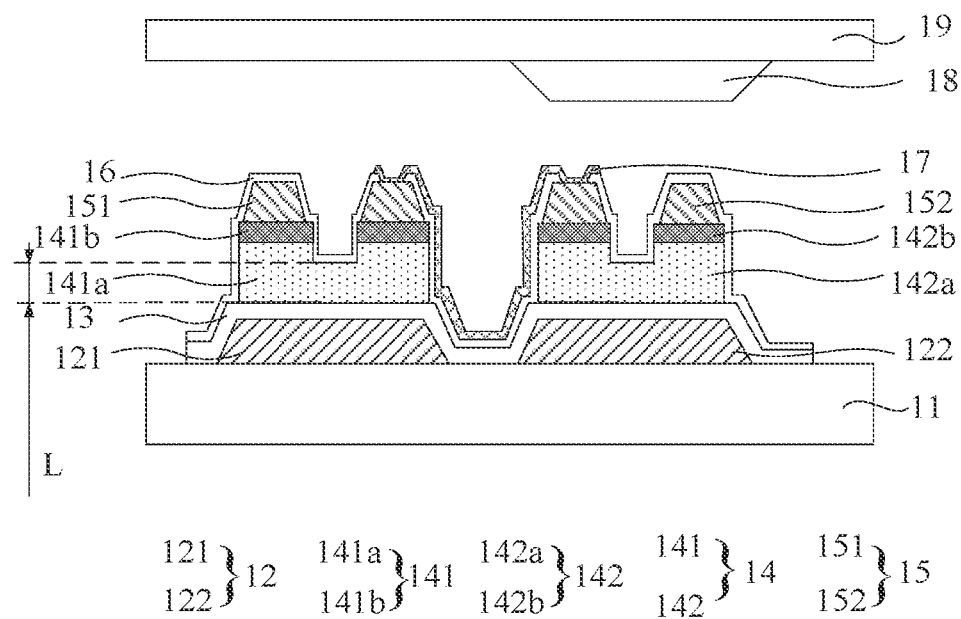
FIG. 1 is a first schematic diagram of a light sensor provided by an embodiment of the present application.
Figure 2:
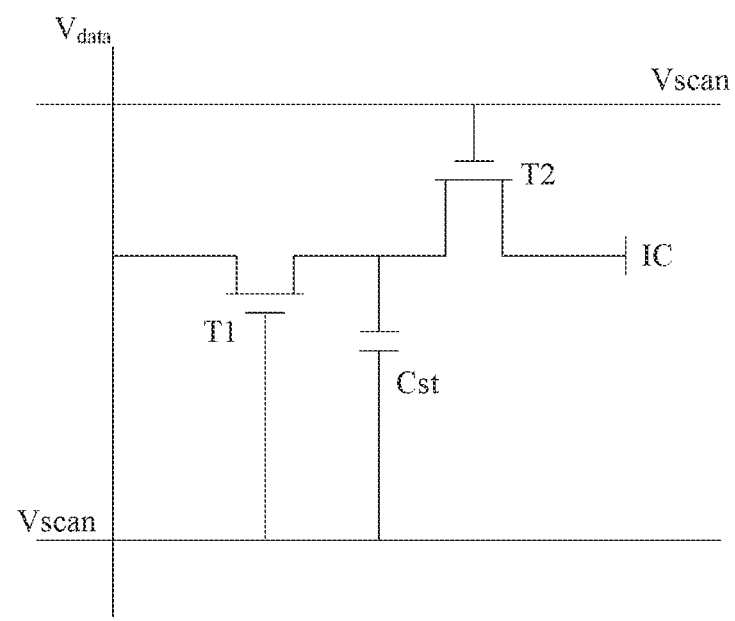
FIG. 2 is a schematic diagram of a light sensor circuit of the light sensor provided by an embodiment of the present application.

As shown in FIGS. 1 and 2, an embodiment of the present application provides a light sensor. The light sensor includes:
a substrate 11;
a gate layer 12 disposed on a side of the substrate 11;
a gate insulating layer 13 disposed on a side of the gate layer 12 away from the substrate 11;
an active layer 14 disposed on a side of the gate insulating layer 13 away from the gate layer 12, wherein the active layer 14 is patterned to form a first active pattern 141 and a second active pattern 142;
a source/drain layer 15 patterned to form a first source, a first drain, a second source, and a second drain; and
a protective layer 16 disposed on the source/drain layer 15 and provided with through holes.

The light sensor further includes a light sensor circuit. The light sensor circuit includes a light sensing transistor T1 and a switching transistor T2. The light sensing transistor T1 includes the first active pattern 141. The switching transistor T2 includes the second active pattern 142. Material of the first active pattern 141 includes amorphous silicon. A thickness L of a channel region of the first active pattern 141 is greater than or equal to 5000 angstroms.

The present application configures the light sensing transistor and the switching transistor to form the light sensor circuit. Moreover, in a structural design, amorphous silicon is configured as the first active pattern of the light sensing transistor, so that the thickness of the channel region of the first active pattern is greater than or equal to 5000 angstroms. Therefore, a number of photo-generated carriers of the light sensing transistor is increased, which makes the light sensor have higher responses and increases fingerprint or palmprint recognition success rates.

It should be explained that in FIG. 1, a thickness of the first active pattern 141 is equal to a thickness of the second active pattern 142. However, in an actual implement, the thicknesses of the first active pattern 141 and the second active pattern 142 are determined according to a specific description of the following embodiments.

It should be explained that reference numeral 151 represents the first source and the first drain, and reference numeral 152 represents the second source and the second drain.

Figure 3A:
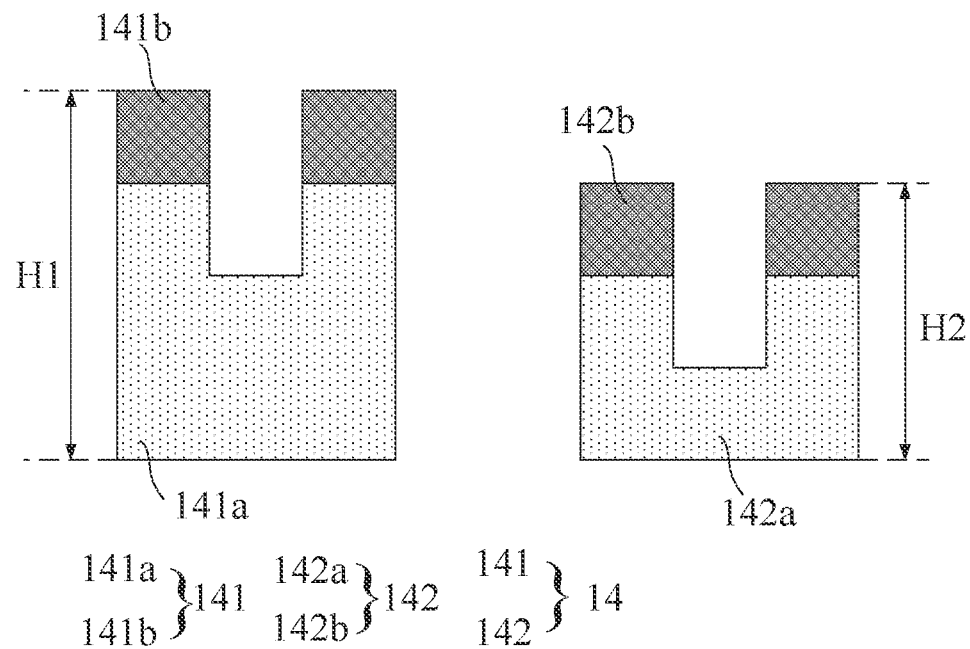
FIGS. 3(a) and 3(b) are a second schematic diagram of the light sensor provided by an embodiment of the present application.
Figure 3B:
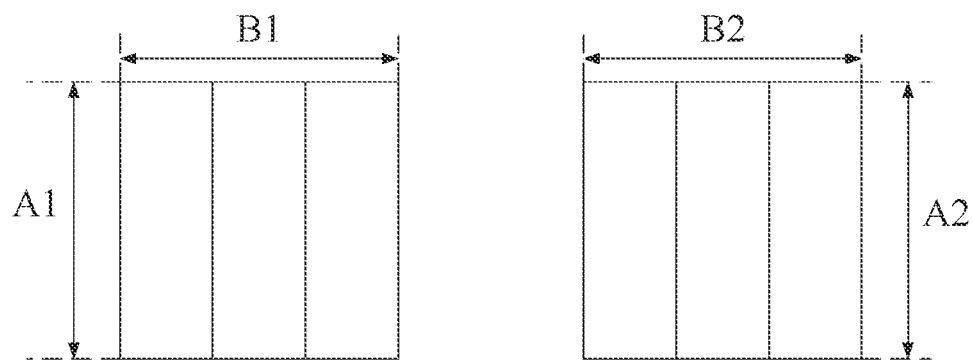

In an embodiment, as shown in FIG. 3, (a) in FIG. 3 is a cross-sectional comparison diagram of the first active pattern and the second active pattern, and (b) in FIG. 3 is a perspective comparison diagram of the first active pattern and the second active pattern. The thickness H1 of the first active pattern 141 is greater than the thickness H2 of the second active pattern 142. A width/length ratio A1/B1 of the first active pattern 141 is greater than or equal to a width/length ratio A2/B2 of the second active pattern 142. In a design process of the light sensor, by increasing the thickness of the channel region of the first active pattern, the number of the photo-generated carriers of the light sensing transistor is increased, thereby increasing recognition success rates of the light sensor. Considering that by increasing a plane area of the first active pattern, which is a projected area of the first active pattern on the substrate, the number of the photo-generated carriers of the light sensing transistor can be further increased, thereby further increasing sensitivity of the light sensor and responses of the light sensor. Therefore, when the width/length ratio of the first active pattern is determined, the width/length ratio of the first active pattern can be greater than or equal to the width/length ratio of the second active pattern, so that the first active pattern is increased in a thickness direction and a plane direction. The number of the photo-generated carriers in the first active pattern is further increased, and the responses and the sensitivity of the light sensor are increased.

It should be explained that sizes of the first active pattern and the second active pattern are determined by the width/length ratios, which is based on a fact that the lengths of the first active pattern and the second active pattern generally do not change during the design process of the light sensor, thereby determining plane area sizes of the first active pattern and the second active pattern. However, in an actual circumstance, the lengths of the first active pattern and the second active pattern change, and the plane area of the first active pattern can be greater than or equal to a plane area of the second active pattern. As a result, the number of the photo-generated carriers in the first active pattern is increased, thereby obtaining a light sensor with high responses.

In this embodiment, considering that the number of the photo-generated carriers of the light sensing transistor is mainly determined by a non-doped active portion, in a specific manufacturing process, it is possible that a thickness of a non-doped active portion of the first active pattern is greater than a thickness of a non-doped active portion of the second active pattern, and meanwhile, the width/length ratio of the first active pattern is greater than or equal to the width/length ratio of the second active pattern.

In an embodiment, considering that the light sensor is applied in a high-resolution environment, and in order to increase accuracy of fingerprint recognition, it is necessary to provide a small-volume light sensor, which needs to reduce a volume of the light sensing transistor. While the thickness of the first active pattern is increased, a volume of the first active pattern is reduced, that is, the thickness of the first active pattern is greater than the thickness of the second active pattern, and the volume of the first active pattern is less than or equal to a volume of the second active pattern. Specifically, while the thickness of the first active pattern is increased, which increases sensitivity of the light sensing transistor, by reducing the plane area of the first active pattern to achieve a small proportion of the first active pattern on a plane, a small light sensor is obtained, thereby improving the accuracy of the fingerprint recognition and enabling the light sensor to be applied to an environment of higher resolutions.

In an embodiment, while realizing high responses and high-resolution application of the light sensor, higher costs of the light sensor and further increase of costs when increasing the thickness of the first active pattern of the light sensing transistor are considered. An embodiment of the present application designs the first active pattern to reduce costs of the light sensing transistor without affecting a performance of the light sensor. Specifically, as shown in FIG. 1, the first active pattern 141 includes the non-doped active portion 141a and a doped active portion 141b. The non-doped active portion 141a includes a high-speed amorphous silicon portion and a low-speed amorphous silicon portion. A thickness of the high-speed amorphous silicon portion ranges from 40 to 60 times of a thickness of the low-speed amorphous silicon portion. By determining the thickness of the high-speed amorphous silicon portion of the non-doped active portion being much greater than the thickness of the low-speed amorphous silicon portion of the doped active portion, the costs are reduced without affecting the performance of the light sensor. When the high-speed amorphous silicon portion and the low-speed amorphous silicon portion are disposed, the high-speed amorphous silicon portion can be disposed on the low-speed amorphous silicon portion.

In an embodiment, the thickness of the low-speed amorphous silicon portion ranges from 100 to 200 angstroms, and the thickness of the high-speed amorphous silicon portion is greater than or equal to 5000 angstroms.

In an embodiment, the second active pattern 142 includes the non-doped active portion 142a and a doped active portion 142b.

In an embodiment, the thickness of the second active pattern is less than or equal to 1200 angstroms.

In an embodiment, when the active layer is patterned to form the first active pattern and the second active pattern, the active layer can include a first active layer and a second active layer. The first active layer is patterned to form the first active pattern. The second active layer is patterned to form the second active pattern. Therefore, the first active pattern and the second active pattern are respectively formed, and the light sensing transistor and the switching transistor are respectively formed when the light sensing transistor and the switching transistor are controlled to formed. Correspondingly, the thicknesses of the first active pattern and the second active pattern can be controlled to realize that the thickness of the first active pattern reaches 5000 angstroms, and the thickness of the second active pattern is configured according to requirements.

In an embodiment, when the active layer is patterned to form the first active pattern and the second active pattern, the first active pattern and the second active pattern can be formed from the active layer at a same time, which can save processes to form the active layer faster. At this time, the first active pattern and the second active pattern of different thicknesses can be formed separately; or the first active pattern and the second active pattern with a same thickness are formed first, and then the second active pattern is etched; or amorphous silicon is deposited on the first active pattern to obtain the first active pattern greater than or equal to 5000 angstroms after the first active pattern and the second active pattern with the same thickness are formed.

In an embodiment, as shown in FIG. 1, the light sensor further includes a metal pattern 17. The metal pattern 17 is connected to the first source and the second drain or is connected to the first drain and the second source through the through holes of the protective layer 16. In the design process, considering that the light sensing transistor and the switching transistor are designed separately, heights of the first source and the first drain are different from heights of the second source and the second drain. Therefore, the through holes can be formed in the protective layer 16, so that the metal pattern 17 connects the first source and the second drain or connects the first drain and the second source to form the light sensor circuit. A sensor chip can determine fingerprints or palmprints by a current of the light sensor circuit, which increases fingerprint or palmprint recognition success rates. In a process of disposed the metal pattern, material with good conductivity can be configured to form the metal pattern, thereby reducing voltage drop occurring to the light sensor circuit.

In an embodiment, furthermore, the first source or the first drain of the light sensing transistor can be connected to the second drain or the second source of the switching transistor through metal traces of the source/drain layer. In the design process, when sources and drains of the light sensing transistor and sources and drains of the switching transistor are formed, metal traces between the sources and the drains of the light sensing transistor and the sources and the drains of the switching transistor are retained. Accordingly, the first source or the first drain of the light sensing transistor can be connected to the second drain or the second source of the switching transistor through metal traces through the sources and the drains without additional metal pattern.

In an embodiment, as shown in FIG. 2, the light sensor circuit further includes a storage capacitor Cst, a data signal line Vdata, a scan signal line Vscan, and a sensor chip terminal IC. In the light sensor, in view of low responses, poor sensitivity, and poor fingerprint or palmprint recognition success rates of current light sensors, an embodiment of the present application adopts a light sensor circuit of 2T1C (two transistors and one storage capacitor), configures amorphous silicon as the first active pattern of the light sensing transistor, and determines the thickness of the channel region of the first active pattern greater than or equal to 5000 angstroms. Therefore, the light sensor has higher responses, better sensitivity, and higher fingerprint or palmprint recognition success rates. Specifically, in the light sensor circuit, when the light sensing transistor T1 is pressed by a fingerprint or a palmprint, light reflected by the fingerprint or the palm print irradiates the channel region of the light sensing transistor. Because the first active pattern in the present application adopts amorphous silicon, and the thickness of the channel region of the first active pattern is greater than or equal to 5000 angstroms, a photocurrent of the light sensing transistor is relatively high. As a result, the photocurrent received by the sensor chip end IC is more accurate and can reduce the Poole-Frenkel effect, thereby obtaining a light sensor with high responses.

In an embodiment, as shown in FIG. 1, the gate layer 12 includes a first gate 121 and a second gate 122, and the source/drain layer 15 includes the first source 151, the first drain 151, the second source 152, and the second drain 152, which means that the gates, the sources, and the drains of the light sensing transistor and the switching transistor can be different of can be formed by different portions of a same film layer.

In an embodiment, material of the substrate includes, but is not limited to glass, aluminum, polyethylene naphthalate, polyethylene terephthalate, and polyimide.

In an embodiment, material of the gate layer includes, but is not limited to indium tin oxide, molybdenum-copper laminate, aluminum-molybdenum laminate, aluminum-copper-molybdenum-titanium-alloy laminate, aluminum-molybdenum-titanium-alloy laminate, nickel-copper laminate, aluminum-nickel laminate, copper-cadmium laminate, aluminum-cadmium laminate, titanium-copper laminate, and aluminum-titanium laminate.

In an embodiment, material of the gate insulating layer includes, but is not limited to aluminum oxide, silicon nitride, silicon dioxide, aluminum nitride, and zirconium oxide.

In an embodiment, when the first active pattern and the second active pattern are respectively formed by the first active layer and the second active layer, material of the first active layer includes amorphous silicon, and material of the second active layer includes, but is not limited to indium zinc oxide, indium oxide, indium gallium zinc oxide, or zinc oxide.

In an embodiment, material of the source/drain layer includes, but is not limited to indium tin oxide, molybdenum-copper laminate, aluminum-molybdenum laminate, aluminum-copper-molybdenum-titanium-alloy laminate, aluminum-molybdenum-titanium-alloy laminate, nickel-copper laminate, aluminum-nickel laminate, copper-cadmium laminate, aluminum-cadmium laminate, titanium-copper laminate, and aluminum-titanium laminate.

In an embodiment, material of the protective layer includes, but is not limited to aluminum oxide, silicon nitride, silicon dioxide, aluminum nitride, and zirconium oxide.

In an embodiment, material of the metal pattern includes, but is not limited to indium tin oxide, molybdenum-copper laminate, aluminum-molybdenum laminate, aluminum-copper-molybdenum-titanium-alloy laminate, aluminum-molybdenum-titanium-alloy laminate, nickel-copper laminate, aluminum-nickel laminate, copper-cadmium laminate, aluminum-cadmium laminate, titanium-copper laminate, and aluminum-titanium laminate.

In an embodiment, as shown in FIG. 1, a light-shielding pattern 18 is disposed on a corresponding region of the switching transistor. By disposing the light-shielding pattern in the corresponding region of the switching transistor, the switching transistor is not irradiated by light, thereby preventing the switching transistor from being exposed to the light and causing performance degradation and preventing the switching transistor from generating photocurrent, which affects a process of the fingerprint recognition.

In an embodiment, material of the light-shading pattern includes, but is not limited to organic materials such as metal, metal oxide, and light-shading resin.

In an embodiment, as shown in FIG. 1, the light sensor further includes a cover plate 19.

In an embodiment, the light sensor is manufactured by following steps: providing the substrate first; sputtering of evaporating a layer of the gate layer on the substrate; forming the gate insulating layer on the gate layer; processing the gate insulating layer with hydrogen; forming the active layer on the gate insulating layer by plasma enhanced chemical vapor deposition; processing the active layer with N-type doping to obtain the non-doped active portion and the doped active portion; sputtering/evaporating the source/drain layer on the active layer; patterning the source and the drain by wet-etching; dry-etching the channel region of the active layer and ensuring that the thickness of active portions of the channel region is greater than 5000 angstroms; forming the protective layer on the source/drain layer; defining through holes on the protective layer and forming the metal pattern to connect the first source or the first drain of the light sensing transistor to the second drain or the second source of the switching transistor; and forming the light-shielding layer on the switching transistor.

In an embodiment, in a process of forming the active layer, when the low-speed amorphous silicon portion is formed, a power range of plasma is 2000 to 3000 watts, and a deposition rate is 4 to 10 angstroms/second; and when the high-speed amorphous silicon portion is formed, the power range of the plasma is 15000 to 20000 watts, and the deposition rate is 30 to 50 angstroms/second.

In an embodiment, when the active layer includes the first active layer and the second active layer, a manufacturing method of the first active layer is as mentioned above, and the second active layer can be formed by sputtering of plasma enhanced chemical vapor deposition.

In an embodiment, the protective layer can be formed by sputtering, chemical vapor deposition, physical vapor deposition, or plasma enhanced chemical vapor deposition.

In addition, an embodiment of the present application further provides a display device. The display device includes a light sensor 41 and a display panel 42.

The light sensor 41 includes:
a substrate 11;
a gate layer 12 disposed on a side of the substrate 11;
a gate insulating layer 13 disposed on a side of the gate layer 12 away from the substrate 11;
an active layer 14 disposed on a side of the gate insulating layer 13 away from the gate layer 12, wherein the active layer 14 is patterned to form a first active pattern 141 and a second active pattern 142;
a source/drain layer 15 patterned to form a first source, a first drain, a second source, and a second drain; and
a protective layer 16 disposed on the source/drain layer 15 and provided with through holes.

The light sensor further includes a light sensor circuit. The light sensor circuit includes a light sensing transistor T1 and a switching transistor T2. The light sensing transistor T1 includes the first active pattern 141. The switching transistor T2 includes the second active pattern 142. Material of the first active pattern 141 includes amorphous silicon. A thickness L of a channel region of the first active pattern 141 is greater than or equal to 5000 angstroms.

The display device provided by the present application includes the display panel and the light sensor. The light sensor is added to the display device to form the light sensor circuit by adopting the light sensing transistor and the switching transistor. Moreover, in a structural design, amorphous silicon is configured as the first active pattern of the light sensing transistor, so that the thickness of the channel region of the first active pattern is greater than or equal to 5000 angstroms. Therefore, a number of photo-generated carriers of the light sensing transistor is increased, which makes the light sensor have higher responses and increases fingerprint or palmprint recognition success rates.

Figure 4:
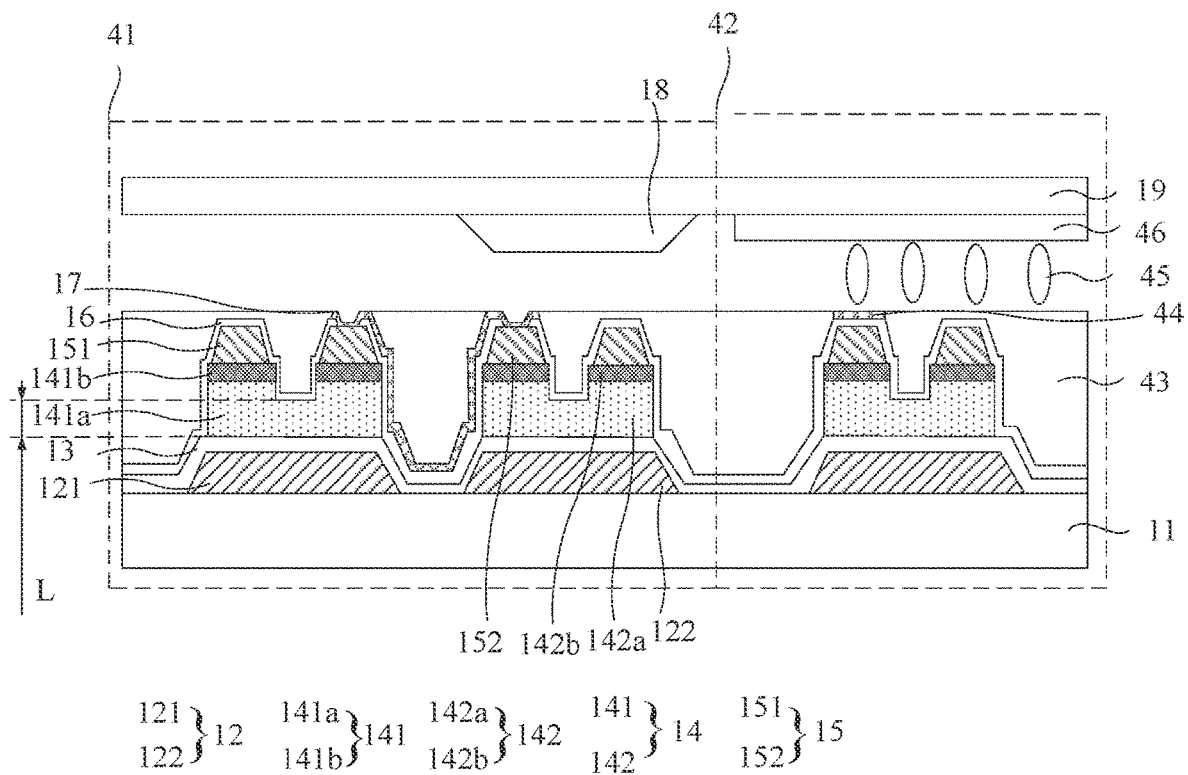
FIG. 4 is a schematic diagram of a display device provided by an embodiment of the present application.

It should be explained that each film layer of the display panel in FIG. 4 is not labeled, and each film layer is same as each film layer of the light sensor.

In an embodiment, as shown in FIG. 4, the display device further includes a pixel electrode layer 44 and a metal pattern 17. The pixel electrode layer 44 is disposed on the protective layer 16. The pixel electrode layer 44 is etched to form the metal pattern 17 and a pixel electrode. While the light sensor is disposed in the display device to increase fingerprint or palmprint recognition success rates, the pixel electrode layer 44 can be etched to form the metal pattern 17 of the light sensor, thereby reducing a thickness of the display device.

In an embodiment, as shown in FIG. 4, the display device further includes a common electrode layer 46. The common electrode layer 46 is etched to form a light-shielding pattern 18. The light-shielding pattern 18 is disposed in a region corresponding to the switching transistor. While the light sensor is disposed in the display device, the common electrode layer 46 can forms the light-shielding pattern 18, thereby reducing the thickness of the display device.

In an embodiment, as shown in FIG. 4, the display device further includes a planarization layer 43. A thickness of the planarization layer 43 corresponding to the light sensing transistor is less than a thickness of the planarization layer corresponding to the switching transistor. By determining the thickness of the planarization layer corresponding to the light sensing transistor being less than the thickness of the planarization layer corresponding to the switching transistor, thicknesses of different regions of the planarization layer become different, thereby preventing the thickness of the display device from increasing and reducing the thickness of the display device.

In an embodiment, in the display device, a thickness of the first active pattern is greater than a thickness of the second active pattern, and a width/length ratio of the first active pattern is greater than or equal to a width/length ratio of the second active pattern.

In an embodiment, in the display device, the thickness of the first active pattern is greater than the thickness of the second active pattern, and a volume of the first active pattern is less than or equal to a volume of the second active pattern.

In an embodiment, in the display device, the thickness of the second active pattern is less than or equal to 1200 angstroms.

In an embodiment, in the display device, the first active pattern includes a non-doped active portion and a doped active portion. The non-doped active portion includes a high-speed amorphous silicon portion and a low-speed amorphous silicon portion. A thickness of the high-speed amorphous silicon portion ranges from 40 to 60 times of a thickness of the low-speed amorphous silicon portion.

In an embodiment, in the display device, the thickness of the low-speed amorphous silicon portion ranges from 100 to 200 angstroms, and the thickness of the high-speed amorphous silicon portion is greater than or equal to 5000 angstroms.

In an embodiment, in the display device, the active layer includes a first active layer and a second active layer. The first active layer is patterned to form the first active pattern. The second active layer is patterned to form the second active pattern.

In an embodiment, in the display device, material of the second active layer includes one of indium zinc oxide, indium oxide, indium gallium zinc oxide, or zinc oxide.

In an embodiment, in the display device, material of the second active pattern includes amorphous silicon.

In an embodiment, in the display device, the light sensor further includes a metal pattern. The metal pattern is connected to the first source and the second drain or is connected to the first drain and the second source through the through holes of the protective layer.

In an embodiment, in the display device, material of the metal pattern includes at least one of indium tin oxide, molybdenum-copper laminate, aluminum-molybdenum laminate, or aluminum-copper-molybdenum-titanium-alloy laminate.

Figure 5:
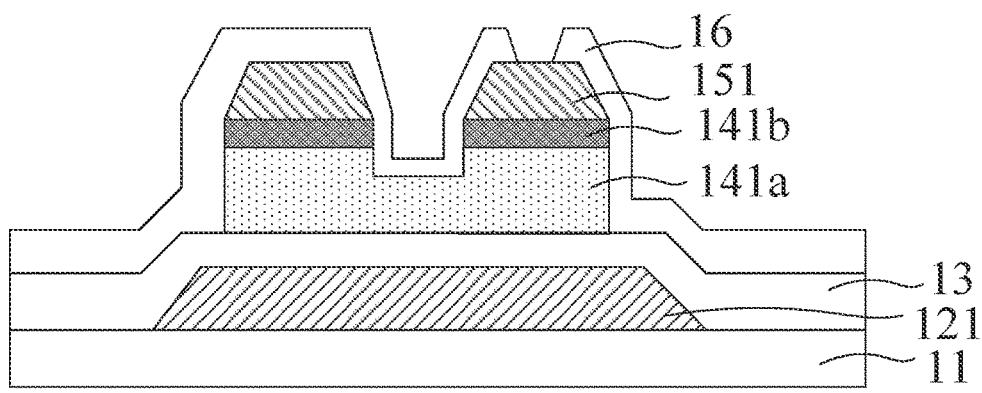
FIG. 5 is a light sensing transistor of the light sensor provided by an embodiment of the present application.
Figure 6:
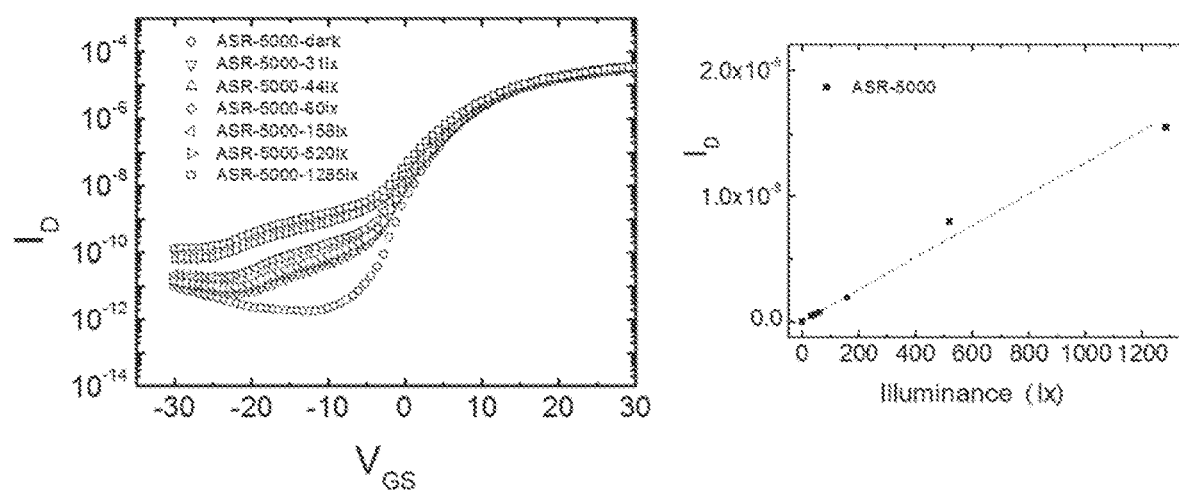
FIG. 6 are line charts of test results of the light sensing transistor provided by an embodiment of the present application.

In an embodiment, when the light sensor shown in FIG. 5 is tested, silicon nitride is configured as the gate insulating layer, the active layer includes 100 angstroms thick low-speed amorphous silicon and 5500 angstroms thick high-speed amorphous silicon, molybdenum-copper is configured as the source/drain layer, and silicon nitride is configured as the protective layer. Test results are shown in FIG. 6. The left chart is curves of the light sensing transistor under different white light intensity, wherein the abscissa of the left chart is VGS, which is a voltage difference between the gate and the source of the light sensing transistor, and the ordinate is ID, which is a leakage current of the light sensing transistor. ASR is a thickness of the channel region of the first active pattern, which is 5000 angstroms in the chart. It can be seen that in the left chart, under light intensity of 158 lx (lux), a contrast of light and dark is increased to a square of 10, which increases a sensitivity of the light sensing transistor. The right chart in FIG. 6 shows changes of photocurrent under different white light intensity, the abscissa Illuminance (lx) is light intensity, its unit is lx (lux), wherein a gate voltage is −10 V, and a drain voltage is 15 V. It can be seen that when the light intensity is 60 lx (lux), the photocurrent of the light sensing transistor is $8*10^{-11}$ A (ampere), and a current in the prior art will be 1 to 2 orders of magnitude lower than the present application. Therefore, the present application improves the light sensor to realize the light sensor with high responses.

It can be known from the above embodiments:

The present application provides the light sensor and the display device. The light sensor includes the substrate, the gate layer, the gate insulating layer, the active layer, the source/drain layer, and the protective layer. The gate layer is disposed on the side of the substrate. The gate insulating layer is disposed on the side of the gate layer away from the substrate. The active layer is disposed on the side of the gate insulating layer away from the gate layer. The active layer is patterned to form a first active pattern and a second active pattern. The source/drain layer patterned to form the first source, the first drain, the second source, and the second drain. The protective layer is disposed on the source/drain layer and provided with the through holes. The light sensor further includes the light sensor circuit. The light sensor circuit includes the light sensing transistor and the switching transistor. The light sensing transistor includes the first active pattern. The switching transistor includes the second active pattern. The material of the first active pattern includes amorphous silicon. The thickness of the channel region of the first active pattern is greater than or equal to 5000 angstroms. The present application configures the light sensing transistor and the switching transistor to form the light sensor circuit. Moreover, in a structural design, amorphous silicon is configured as the first active pattern of the light sensing transistor, so that the thickness of the channel region of the first active pattern is greater than or equal to 5000 angstroms. Therefore, a number of photo-generated carriers of the light sensing transistor is increased, which makes the light sensor have higher responses and increases fingerprint or palmprint recognition success rates.

In the above embodiments, the descriptions of the various embodiments are different in emphases, for contents not described in detail, please refer to related description of other embodiments.

Understandably, those having ordinary skills of the art may easily contemplate various changes and modifications of the technical solution and technical ideas of the present application and all these changes and modifications are considered within the protection scope of right for the present application.

What is claimed is:

1. A light sensor, comprising:
a substrate;
a gate layer disposed on a side of the substrate;
a gate insulating layer disposed on a side of the gate layer away from the substrate;
an active layer disposed on a side of the gate insulating layer away from the gate layer, wherein the active layer is patterned to form a first active pattern and a second active pattern;
a source/drain layer patterned to form a first source, a first drain, a second source, and a second drain;
a protective layer disposed on the sourceldrain layer and provided with through holes; and
a planarization layer;
wherein the light sensor fu other comprises a light sensor circuit, the light sensor circuit comprises a light sensing transistor and a switching transistor, the light sensing transistor comprises the first active pattern, the switching transistor comprises the second active pattern, material of the first active pattern comprises amorphous silicon, and a thickness of a channel region of the first active pattern is greater than or equal to 5000 angstroms,
wherein a thickness of the planarization layer corresponding to the light sensing transistor is less than a thickness of the planarization layer corresponding to the switching transistor.

2. The light sensor according to claim 1, wherein a thickness of the first active pattern is greater than a thickness of the second active pattern, and a width/length ratio of the first active pattern is greater than or equal to a width/length ratio of the second active pattern.

3. The light sensor according to claim 1, wherein a thickness of the first active pattern is greater than a thickness of the second active pattern, and a volume of the first active pattern is less than or equal to a volume of the second active pattern.

4. The light sensor according to claim 1, wherein the first active pattern comprises a non-doped active portion and a doped active portion, the non-doped active portion comprises a high-speed amorphous silicon portion and a low-speed amorphous silicon portion, and a thickness of the high-speed amorphous silica portion ranges from 40 to 60 times of a thickness of the low-speed amorphous silicon portion.

5. The light sensor according to claim 1, wherein the active layer comprises a first active layer and a second active layer, the first active layer is patterned to form the first active pattern, and the second active layer is patterned to form the second active pattern.

6. The light sensor according to claim 1, further comprising a metal pattern, wherein the metal pattern is connected to the first source and the second drain or is connected to the first drain and the second source through the through holes of the protective layer.

7. A display device, comprising a light sensor and a display panel, wherein the light sensor comprises:
- a substrate;
- a gate layer disposed on a side of the substrate;
- a gate insulating layer disposed on a side of the gate layer away from the substrate;
- an active layer disposed on a side of the gate insulating layer away from the gate layer, wherein the active layer is patterned to form a first active pattern and a second active pattern;
- a source/drain layer patterned to form a first source, a first drain, a second source, and a second drain;
- a protective layer disposed on the source/drain layer and provided with through holes; and
- a planarization layer;
- wherein the light sensor further comprises a light sensor circuit, the light sensor circuit comprises a light sensing transistor and a switching transistor, the light sensing transistor comprises the first active pattern, the switching transistor comprises the second active pattern, material of the first active pattern comprises amorphous silicon, and a thickness of a channel region of the first active pattern is greater than or equal to 5000 angstroms,
- wherein a thickness of the planarization layer corresponding to the light sensing transistor is less than a thickness of the planarization layer corresponding to the switching transistor.

8. The display device according to claim 7, further comprising, a pixel electrode layer and a metal pattern, wherein the pixel electrode layer is disposed on the protective layer, and the pixel electrode layer is etched to form the metal pattern and a pixel electrode.

9. The display device according to claim 8, further comprising a common electrode layer, wherein the common electrode layer is etched to form a light-shielding pattern, and the light-shielding pattern is disposed in a region corresponding to the switching transistor.

10. The display device according to claim 7, wherein a thickness of the first active pattern is greater than a thickness of the second active pattern, and a width/length ratio of the first active pattern is greater than or equal to a width/length ratio of the second active pattern.

11. The display device according to claim 7, wherein a thickness of the first active pattern is greater than a thickness of the second active pattern, and a volume of the first active pattern is less than or equal to a volume of the second active pattern.

12. The display device according to claim 11, wherein the thickness of the second active pattern is less than or equal to 1200 angstroms.

13. The display device according to claim 7, wherein the first active pattern comprises a non-doped active portion and a doped active portion, the non-doped active portion comprises a high-speed amorphous silicon portion and a low-speed amorphous silicon portion, and a thickness of the high-speed amorphous silicon portion ranges from 40 to 60 times of a thickness of the low-speed amorphous silicon portion.

14. The display device according to claim 13, wherein a thickness of the low-speed amorphous silicon portion ranges from 100 to 200 angstroms, and a thickness of the high-speed amorphous silicon portion is greater than or equal to 5000 angstroms.

15. The display device according to claim 7, wherein the active layer comprises a first active layer and a second active layer, the first active layer is patterned to form the first active pattern, and the second active layer is patterned to form the second active pattern.

16. The display device according to claim 15, wherein material of the second active layer comprises one of indium zinc oxide, indium oxide, indium gallium zinc oxide, or zinc oxide.

17. The display device according to claim 7, wherein material of the second active pattern comprises amorphous silicon.

18. The display device according to claim 7, wherein the light sensor further comprises a metal pattern, and the metal pattern is connected to the first source and the second drain or is connected to the first drain and the second source through the through holes of the protective layer.

19. The display device according to claim 18, wherein material of the metal pattern comprises at least one of indium tin oxide, molybdenum-copper laminate, aluminum-molybdenum laminate, or aluminum-copper-molybdenum-titanium-alloy laminate.

20. A display device, comprising a light sensor and a display panel, wherein the light sensor comprises:
- a substrate;
- a gate layer disposed on a side of the substrate;
- a gate insulating layer disposed on a side of the gate layer away from the substrate;
- an active layer disposed on a side of the gate insulating layer away from the gate layer, wherein the active layer is patterned to form a first active pattern and a second active pattern;
- a source/drain layer patterned to form a first source, a first drain, a second source, and a second drain; and
- a protective layer disposed on the source/drain layer and provided with through holes;
- wherein the light sensor further comprises a light sensor circuit, the light sensor circuit comprises a light sensing transistor and a switching transistor, the light sensing transistor comprises the first active pattern, the switching transistor comprises the second active pattern, material of the first active pattern comprises amorphous silicon, and a thickness of a channel region of the first active pattern is greater than or equal to 5000 angstroms,
- wherein the first active pattern comprises a non-doped active portion and a doped active portion, the non-doped active portion comprises a high-speed amorphous silicon portion and a low-speed amorphous silicon portion, and a thickness of the high-speed amorphous silicon portion ranges from 40 to 60 times of a thickness of the low-speed amorphous silicon portion.

* * * * *